Feb. 28, 1933.  L. WAINWRIGHT  1,899,170
UNIVERSAL JOINT
Filed Dec. 7, 1931   3 Sheets-Sheet 1
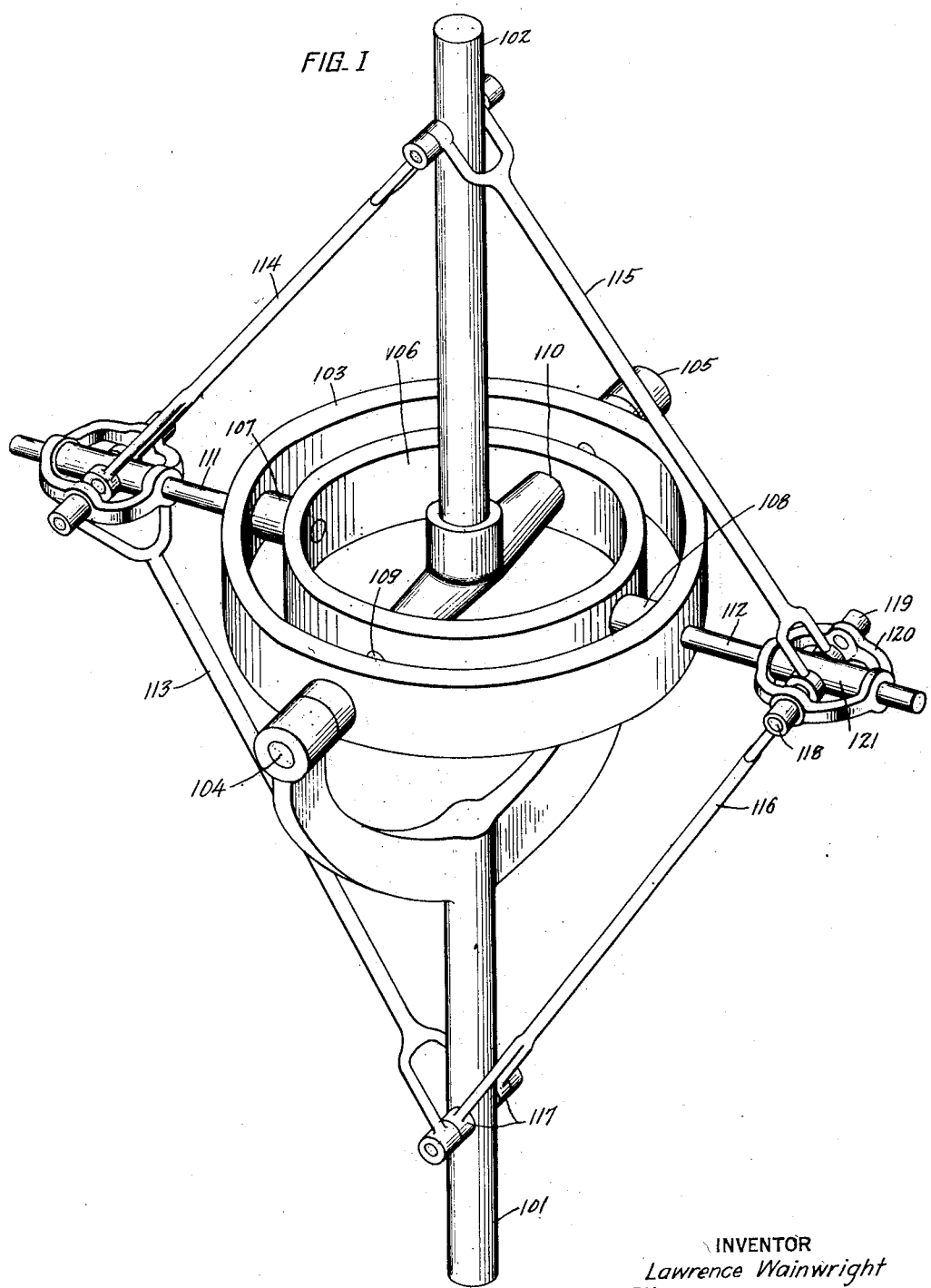
INVENTOR
Lawrence Wainwright
BY
*Robert A. Lavender*
ATTORNEY

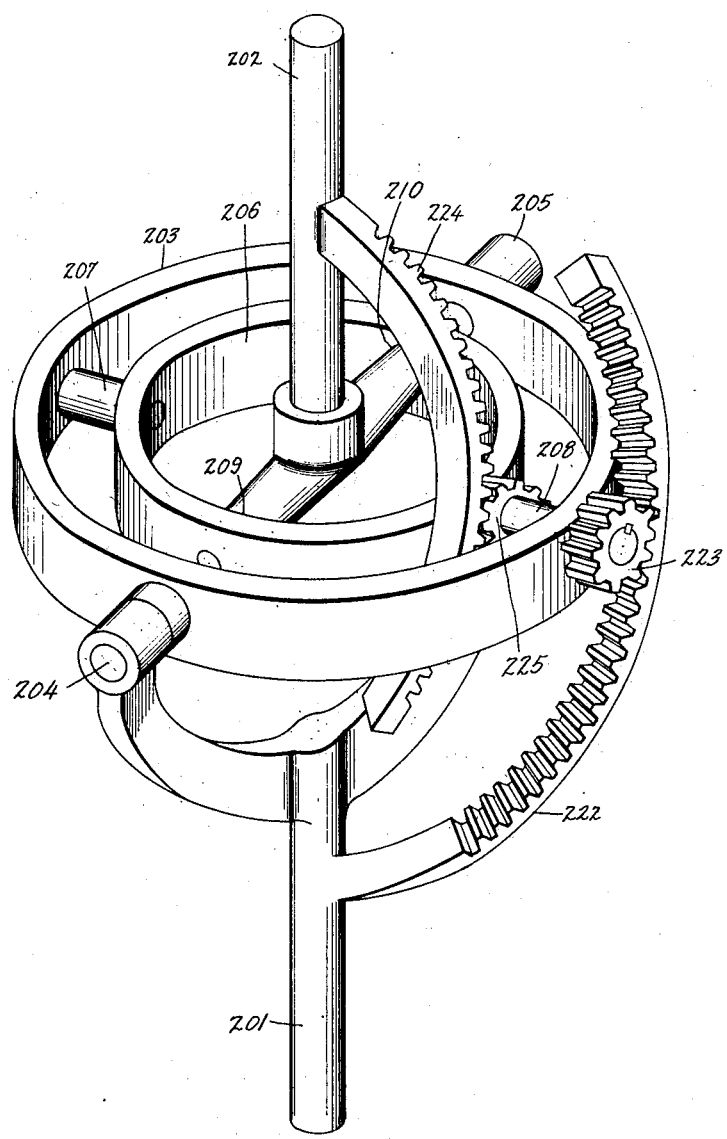

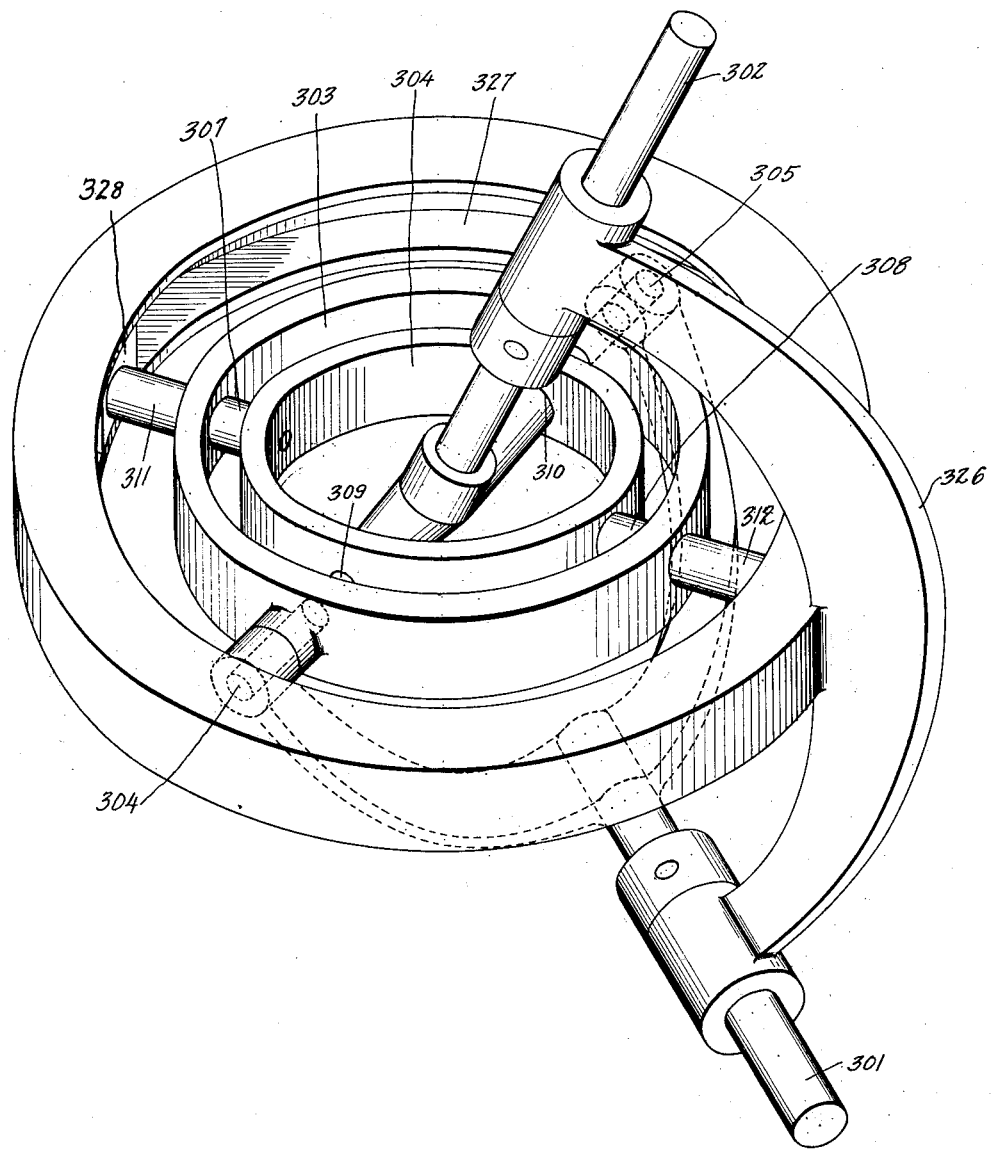

UNITED STATES PATENT OFFICE

LAWRENCE WAINWRIGHT, OF THE UNITED STATES NAVY

UNIVERSAL JOINT

Application filed December 7, 1931. Serial No. 579,549.

(GRANTED UNDER THE ACT OF MARCH 3, 1883, AS AMENDED APRIL 30, 1928; 370 O. G. 757)

My invention relates to universal joints and more particularly to equal increment universal joints.

An object of my invention is to provide a joint for connecting two shafts at an angle to each other whereby the rotation of one shaft is transferred, increment by increment, without relative change of speed, to the other shaft.

Another object is to provide a joint for connecting two shafts whereby any change in the angle between the shafts will not cause rotation or, if rotating, any change in rotation of the shafts.

When a single Hooke's joint is used to connect two shafts and the angular velocity of the driving shaft is $W_1$, the angular velocity $W$ of the driven shaft is varying during each revolution from a value $$W_{max} = \frac{W_1}{\cos x}$$

to a value $Wmin = W_1 \times \cos x$, where $x$ is the angle between the shafts.

But two parallel or intersecting shafts may be connected by a double Hooke's joint, known as a universal joint, and have uniform motions, provided that the intermediate shaft makes equal angles with the connecting shafts and that the links on the intermediate shaft are in the same plane. See Elements of Mechanism, Schwamb and Merrill 1904, pp. 110 to 113.

The same motion is obtained if the connecting shaft and its links are eliminated and one ring link mounted inside the other and pivoted on a common axis that passes through the points where the links from the intermediate shaft had been pivoted. This axis is perpendicular to the longitudinal axis of the eliminated shaft which in this invention is called the line-of-pivots. The rule above can now be changed as follows: Two parallel or intersecting shafts may be connected by a double Hooke's joint and have uniform motions, provided that the line-of-pivots makes equal angles with the connection shafts.

In this specification the term "bisecting plane" will be used to designate that plane which is normal to the plane of and bisects the angle between the two shaft-axes. It is clear that if the line-of-pivots be kept in the bisecting plane, it will make equal angles with the connecting shafts. The apparatus of this invention is designed to perform this function.

There are many applications of such a joint, two of which will be given by way of illustration.

At the present time, compasses, both magnetic and gyroscopic, repeater compasses and dumb compasses in pelorus stands, are mounted in gimbals, that is, the active part of the compass is supported in the binnacle or stand by means of a double Hooke's joint. Here the shaft connected to the outer ring is the driving shaft, and it is secured to the ship; the shaft connected to the inner ring is the driven shaft, and it is represented by the compass bowl which is maintained in a vertical position by a weight at its lower extremity, the compass card being perpendicular to the driven shaft. In such a joint as stated above, the velocity of the driven shaft varies from the velocity of the driving shaft unless the line-of-pivot is maintained in the bisecting plane. Suppose the gimbals are mounted with the line-of-pivots fore and aft; if the ship rolls carrying the axis of the binnacle with it, the axis of the compass bowl remaining vertical due to the force of gravity acting on the weight attached to the bowl, the line-of-pivots would probably remain in the bisecting plane. But if the ship pitches, the line-of-pivots would not stay in the bisecting plane and any turning of the ship while in this position would result in a greater or lesser turning of the compass bowl and hence errors in the compass reading. It is thus seen that as the ship rolls, pitches and turns errors are introduced into the compass reading unless some means is supplied to maintain the line-of-pivots in the bisecting plane whereby the turning of the ship and the turning of the compass bowl will be maintained exactly equal. In other words, an element of the compass bowl fixed to and perpendicular to the driven shaft is unaffected by any motion of the driving shaft relative to the driven shaft, that does not involve rotation of driving shaft about its axis, and the angular movements of the two shafts about their respective axes are equal at all times. This error is distinct from the effects on the magnetic compass due to changing ships' magnetism, and the effects on the gyroscopic compass due to accelerations, as set up by the roll and pitch.

Another application of this type of joint is in automotive vehicles, as in applying power to the front wheels of an automobile, by which wheels the vehicle is also steered. It is evident that with the engine running at a constant speed it is desirable to have the powered wheels rotate uniformly despite their varying angles to the transmission shaft due to steering.

My invention can best be understood by reference to the accompanying drawings forming a part of this specification in which Fig. 1 shows a system of rods and links for maintaining the line-of-pivots in the bisecting plane;

Fig. 2 shows a system of racks and pinions for accomplishing the same purpose;

Fig. 3 shows two shafts at a fixed angle, the bisecting plane being represented by a circular track in which travel the shoes suitably pivoted to the line-of-pivots.

Similar numerals refer to similar parts throughout the several views.

Referring now particularly to Fig. 1, parts 101 and 102 are the main shafts which it is the purpose of the joint to connect. Shaft 101, which may be denoted as the outer shaft, is pivoted to the outer ring 103 at 104 and 105. The outer ring 103 is in turn pivoted to the inner ring 106 at 107 and 108. The inner shaft 102 is pivoted to the inner ring 106 at 109 and 110. On the outer ring 103 the line-of-pivots 104, 105 is perpendicular to the line-of-pivots 107, 108, and on the inner ring 106 the line of pivots 107, 108 is perpendicular to the line-of-pivots 109, 110. When the "line-of-pivots" is referred to without designation, that line is meant which passes through the pivots connecting the two rings, that is, 107, 108.

From the construction so far given, it is obvious that shafts 101 and 102 are free to assume different angles to one another and that the rotation of one will be imparted to the other. It remains to insure constant equality between the rotational increments.

The line-of-pivots 107, 108 is physically extended in the form of rods 111 and 112 which may form integral parts of outer ring 103 or may be extensions of the pivot pins. These rods 111 and 112 which represent the line of pivots 107, 108 and must therefore be kept in the bisecting plane, are joined by the pivoted links 113, 114, 115, 116 to points on the shafts 101, 102, these points being equidistant from the common center of the joint.

Link 116, for example, is pivoted to shaft 101 at 117 and at 118 and 119 is pivoted to ring 120 which in turn is capable of rotating around and sliding along rod 112. Link 115 is similarly pivoted to shaft 102 and to collar 121 which fits snugly inside ring 120, slides with it along rod 112 and is capable of rotating separately about rod 112. Links 113 and 114 are respectively similar to links 116 and 115 and similarly connected to shafts 101, 102 and rod 111. It will be noted that the links 113, 114, 115 and 116 form a double togglejoint connecting shafts 101 and 102.

This construction results in equal triangles formed by the shaft axes, the line-of-pivots and the axes of the links, so that the axis of the rods 111, 112 lies always in the bisecting plane, and the rotational increments of shaft 101 are exactly duplicated in shaft 102 at whatever angle, within limits, that these shafts may be to one another, the angle being constant or varying.

Referring now particularly to Fig. 2, the construction is in the main the same, but the manner of maintaining the line-of-pivots 207, 208 in the bisecting plane has been varied. In lieu of the rods and links of the previous form we have racks and pinions for accomplishing the same purpose. Affixed to shaft 201 is the curved rack 222 which engages pinion 223, while affixed to shaft 202 is the curved rack 224 which engages the pinion 225. Pinions 223 and 225 are keyed to the same shaft which also forms the pivot 208 between the ring 203 and 206. The curvature of the racks 222 and 224 and the diameters of the pinions 223 and 225 are proportioned to their distances from the common center of the joint. As shown, the racks are engaged on opposite sides of the pinions. The result is that the line-of-pivots 207, 208 is maintained substantially in the bisecting plane.

Referring now particularly to Fig. 3, the main features of construction are again the same, the variations pertaining to the manner of maintaining the line-of-pivots 307, 308 in the bisecting plane. In this case, the angle between the shafts 301 and 302 is to remain fixed so they are shown journaled in a bracket. As in the first form, the line-of-pivots 307, 308 is physically extended as shown at 311 and 312. Advantage is taken of the constant position of the bisecting plane which is physically represented by the annular track 327 in which the extensions 311 and 312 are, by shoes 328, constrained to run. If extensions 311 and 312 are integral with ring 303, the shoes must be pivoted to allow rotation between them and the extensions.

In all the foregoing forms as far as theoretical operation is concerned, the ring 103 and 104 need not be complete but may each be replaced by a single quadrant, with corresponding reduction in mechanism. This in the form of Fig. 1 would do away with the links on one side, as 113 and 114, together with their associated parts. In the form of Fig. 2, the pinions 223 and 225 may occupy various positions along the axis of pivots 207, 208. In the form of Fig. 3 one extension, such as 312, may be dispensed with and the annular track may be in various forms and may be otherwise supported. The bracket 326 may be dispensed with provided other means are present in the mechanism associated with the joint for accomplishing the same result.

It will be understood that the above description and accompanying drawings comprehend only the general and preferred embodiment of my invention and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon or therefor.

Having thus described my invention, what I claim is:

1. In combination, a universal joint connecting two shafts whose axes intersect, the elements of said joint having a common line-of-pivots, a rod extending outwardly from said joint and having its axis coincide with the line-of-pivots, a first member slidable upon and rotatable about said rod, a second member slidable upon said rod with said first member but separately rotatable about said rod, a first link having one end pivoted to one shaft and the other pivoted to said first member, and a second link having one end pivoted on the other shaft and the other end pivoted to said second member, said links having their corresponding pivots equally distant from the point of intersection of said shafts.

2. In combination, a universal joint connecting two shafts whose axes intersect, the elements of said joint having a common line-of-pivots, rods extending outwardly from opposite sides of said joint and having their axes coincident with the line-of-pivots, a first member fitted on each of said rods slidable upon and rotatable about said rods, a second member fitted on each of said rods slidable with said first member but separately rotatable about said rods, first links each having one end pivotally connected to the first shaft and the other end pivotally connected respectively to said first members, and second links each having one end pivotally connected to the second shaft and the other end pivotally connected respectively to said second members, said links having their corresponding pivots equally distant from the point of intersection of said shafts.

3. In combination, a shaft, an annular member to which said shaft is pivotally connected at the opposite ends of a diameter, a second annular member disposed around said annular member and pivotally connected to said annular member at the opposite ends of a diameter at right angles to the aforesaid diameter, a second shaft pivotally connected to said second annular member at points colinear with the first mentioned diameter, and a double toggle-joint connecting said shafts and having two of the junctions between its links movable colinearly with the second diameter.

LAWRENCE WAINWRIGHT.